United States Patent
Marconi

(10) Patent No.: US 11,492,989 B2
(45) Date of Patent: Nov. 8, 2022

(54) METHOD TO CONTROL A ROAD VEHICLE DURING A SLIP OF THE DRIVE WHEELS

(71) Applicant: FERRARI S.p.A., Modena (IT)

(72) Inventor: Stefano Marconi, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 17/590,178

(22) Filed: Feb. 1, 2022

(65) Prior Publication Data

US 2022/0268228 A1 Aug. 25, 2022

(30) Foreign Application Priority Data

Feb. 19, 2021 (IT) .......................... 102021000003863

(51) Int. Cl.
*F02D 41/22* (2006.01)
*B60W 30/20* (2006.01)
(Continued)

(52) U.S. Cl.
CPC ....... *F02D 41/021* (2013.01); *F02D 41/0082* (2013.01); *F02D 41/22* (2013.01);
(Continued)

(58) Field of Classification Search
CPC ............... F02D 41/021; F02D 41/0082; F02D 2041/224; F02D 2200/0804;
(Continued)

(56) References Cited

U.S. PATENT DOCUMENTS 5,159,990 A * 11/1992 Abe ........................ B60K 28/16
 180/197
5,485,380 A * 1/1996 Takasuka ............... G01L 23/225
 180/197

(Continued)

FOREIGN PATENT DOCUMENTS

EP 1710423 A1 10/2006
EP 2388460 A1 * 11/2011 ......... F02D 41/0082
(Continued)

OTHER PUBLICATIONS

Italian Search Report for Application No. 102021000003863 dated Nov. 18, 2021, 9 pages.

*Primary Examiner* — George C Jin
(74) *Attorney, Agent, or Firm* — Cantor Colburn LLP

(57) ABSTRACT

A method to control a road vehicle during a slip of the drive wheels, which are caused to rotate by an internal combustion engine provided with a plurality of cylinders arranged in two banks, and with a plurality of fuel injectors each injecting fuel into a corresponding cylinder. The control method comprises the steps of: detecting a slip of at least one drive wheel; and controlling the internal combustion engine, only during a slip of at least one drive wheel, with a signalling law, which causes the internal combustion engine to work in an abnormal manner so as to generate an abnormal vibration and/or an abnormal noise, which can be perceived by the driver. The internal combustion engine has two twin control units, each of which is associated with a corresponding bank, controls all and the sole injectors of its own bank and (Continued)

actuates the signalling law completely independently of and autonomously from the other control unit.

15 Claims, 6 Drawing Sheets

(51) Int. Cl.
    *F02D 41/02*     (2006.01)
    *F02D 41/00*     (2006.01)

(52) U.S. Cl.
    CPC ....... *B60W 30/20* (2013.01); *B60W 2030/206* (2013.01); *B60W 2510/0623* (2013.01); *B60W 2510/0638* (2013.01); *B60W 2510/0657* (2013.01); *B60W 2520/26* (2013.01); *B60W 2530/12* (2013.01); *F02D 2041/224* (2013.01); *F02D 2200/0804* (2013.01); *F02D 2200/101* (2013.01)

(58) Field of Classification Search
    CPC ............ F02D 2200/101; B60W 30/20; B60W 2030/206; B60W 2510/0623; B60W 2510/0638; B60W 2510/0657; B60W 2520/26; B60W 2530/12

See application file for complete search history.

(56) References Cited

U.S. PATENT DOCUMENTS

| | | |
|---|---|---|
| 5,816,353 A | 10/1998 | Matsuki |
| 5,971,089 A | 10/1999 | Sawada |
| 6,223,592 B1 * | 5/2001 | Genise .................. B60W 10/11 |
| | | 73/115.02 |
| 2014/0000556 A1 | 1/2014 | Nakamura et al. |
| 2016/0025046 A1 * | 1/2016 | Kuze .................. F02D 41/0065 |
| | | 123/568.2 |
| 2022/0268228 A1 * | 8/2022 | Marconi ............. F02D 41/0082 |

FOREIGN PATENT DOCUMENTS

| | | |
|---|---|---|
| EP | 2505414 A1 | 10/2012 |
| GB | 2317716 A | 4/1998 |
| JP | 7150973 A | 6/1995 |

* cited by examiner

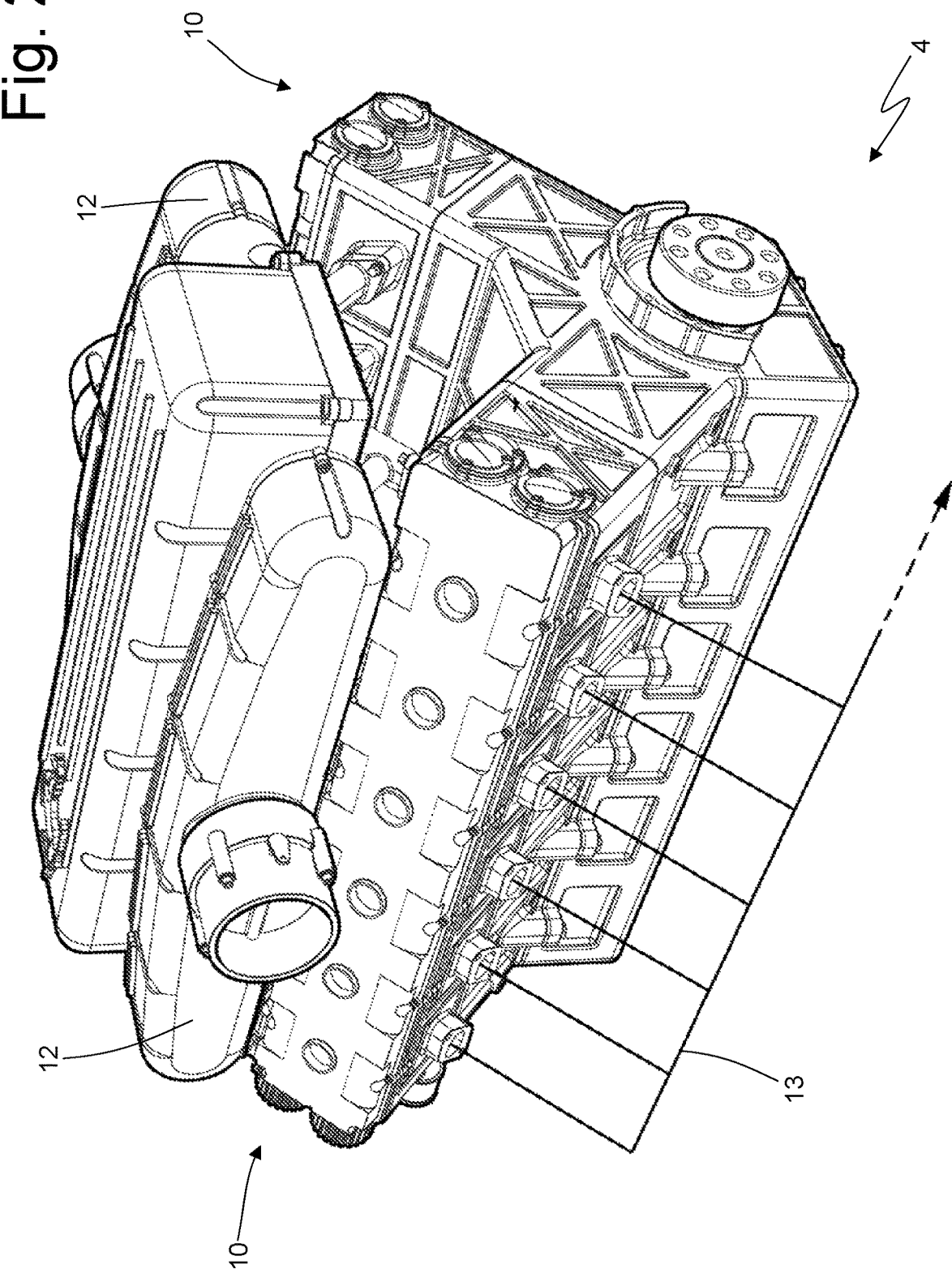

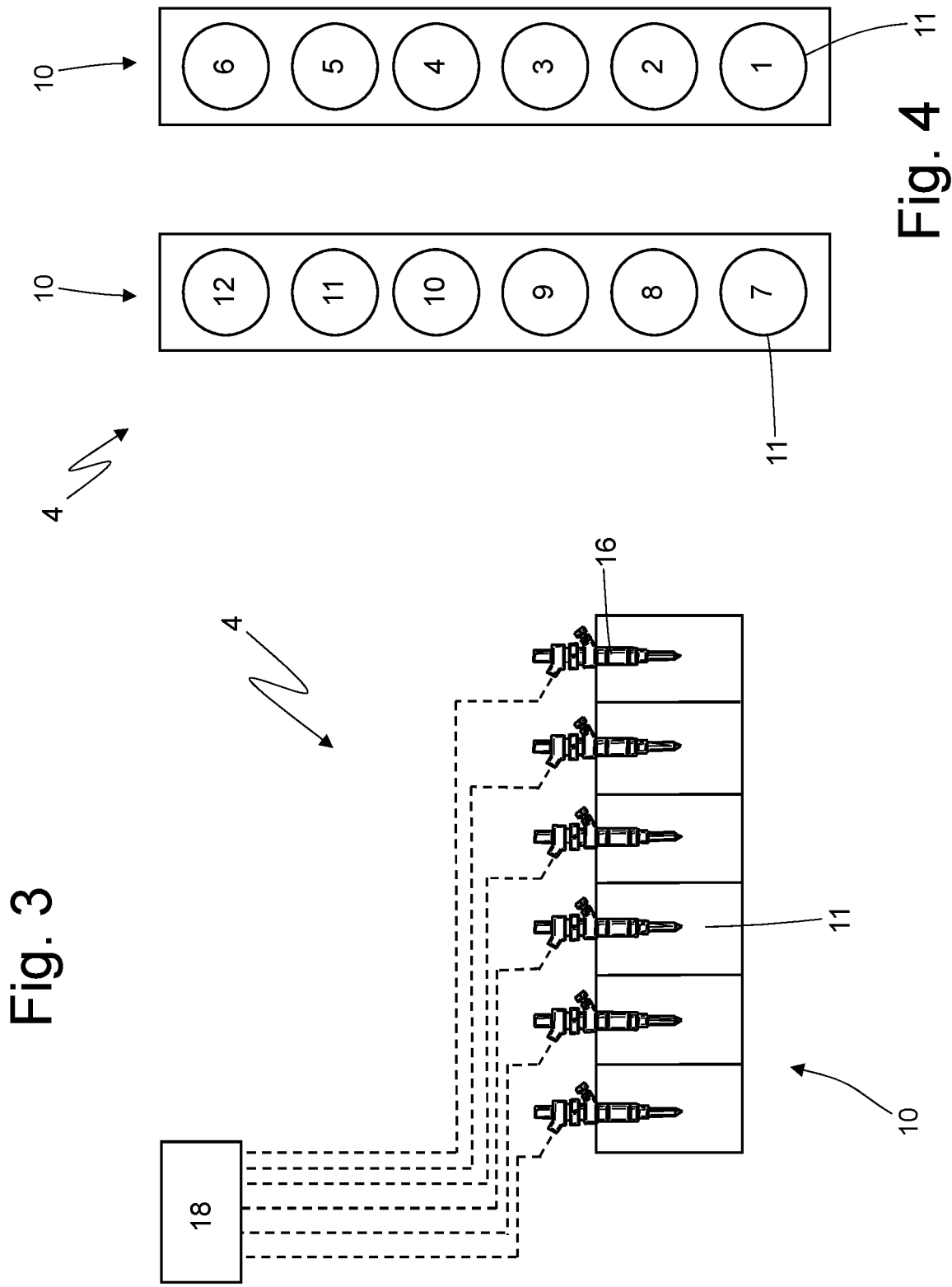

METHOD TO CONTROL A ROAD VEHICLE DURING A SLIP OF THE DRIVE WHEELS

CROSS-REFERENCE TO RELATED APPLICATIONS

This patent application claims priority from Italian patent application no. 102021000003863 filed on Feb. 19, 2021, the entire disclosure of which is incorporated herein by reference.

TECHNICAL FIELD

The invention relates to a method to control a road vehicle during a slip of the drive wheels.

The invention finds advantageous application in a car, to which explicit reference will be made in the description below without because of this losing in generality.

PRIOR ART

A modern car is provided with an electronic traction control system, which is identified with the acronym ASR ("Anti-Slip Regulation" or "Anti-Spin Regulation") or with the acronym TCS ("Traction Control System"). The electronic traction control system cyclically measures the rotational speed of each wheel and compares the rotational speeds of all wheels; if a drive wheel rotates faster than the other wheels (especially the driven wheels), a slid is identified, which is countered by basically reducing the torque generated by the internal combustion engine.

In a spark-ignition internal combustion engine operating according to an Otto cycle, the reduction of the torque is obtained by reducing the supply of air and, hence, by reducing the supply of fuel accordingly and can also be obtained by acting, in the first instants (in order to have a quicker intervention), upon the spark advance.

Current traction controls are very effective and also very versatile, since they not only completely eliminate the slip of the drive wheels, but also manage to maintain, for limited amounts of times (for example, during a start when the vehicle is parked or while driving along a bend with the car slightly yawing because of the oversteering), the drive wheels with a small and predetermined (namely, desired) slip.

Generally speaking, in the dashboard of the car there is a light indicator that lights up to warn the driver that the traction control was activated because of a slip of the drive wheels; however, this signal can be mistaken for something else or can be completely ignored, especially when the driver is trying to deliver a professional performance and, hence, is extremely focused on the road ahead of the car and not the dashboard. Besides, the light indicator signalling the intervention of the traction control does not normally light up when the slip of the drive wheels is "controlled" (namely, is maintained at small and predetermined levels).

Patent application EP2505414A1 discloses a motorcycle provided with a traction control system, which reduces the torque applied to the rear wheel when the rear wheel shows a slip factor exceeding a first threshold value; furthermore, when the slip factor exceeds a second threshold value (which is smaller than the first threshold value), a warning for the driver is generated also through an oscillation of the throttle valve, so as to cause a corresponding oscillation of the torque applied to the rear wheel.

Patent applications EP0443785A1 and GB2317716A describe a car provided with a traction control system, which reduces the torque applied to the drive wheels when the drive wheels slip; in particular, the torque is reduced by cyclically turning off one or more cylinders, namely by avoiding injecting fuel into one or more cylinders. However, the traction control mode disclosed in patent applications EP0443785A1 and GB2317716A determines a very marked irregularity in the operation of the internal combustion engine, which, on the one hand, is normally deemed to be excessive and scarcely comfortable by drivers and, on the other hand, can damage both the transmission and the exhaust system over time.

DESCRIPTION OF THE INVENTION

The object of the invention is to provide a method to control a road vehicle during a slip of the drive wheels, said control method improving the interaction between the driver and the vehicle during a slip of the drive wheels and, at the same time, being easy and economic to be implemented.

According to the invention, there is provided a method to control a road vehicle during a slip of the drive wheels according to the appended claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein:

FIG. 2 is a perspective view of the internal combustion engine of the car of FIG. 1;

FIG. 3 is a schematic view of a bank of the internal combustion engine of FIG. 2;

FIG. 4 is a schematic view of both banks of the internal combustion engine of FIG. 2;

PREFERRED EMBODIMENTS OF THE INVENTION

Figure 1:
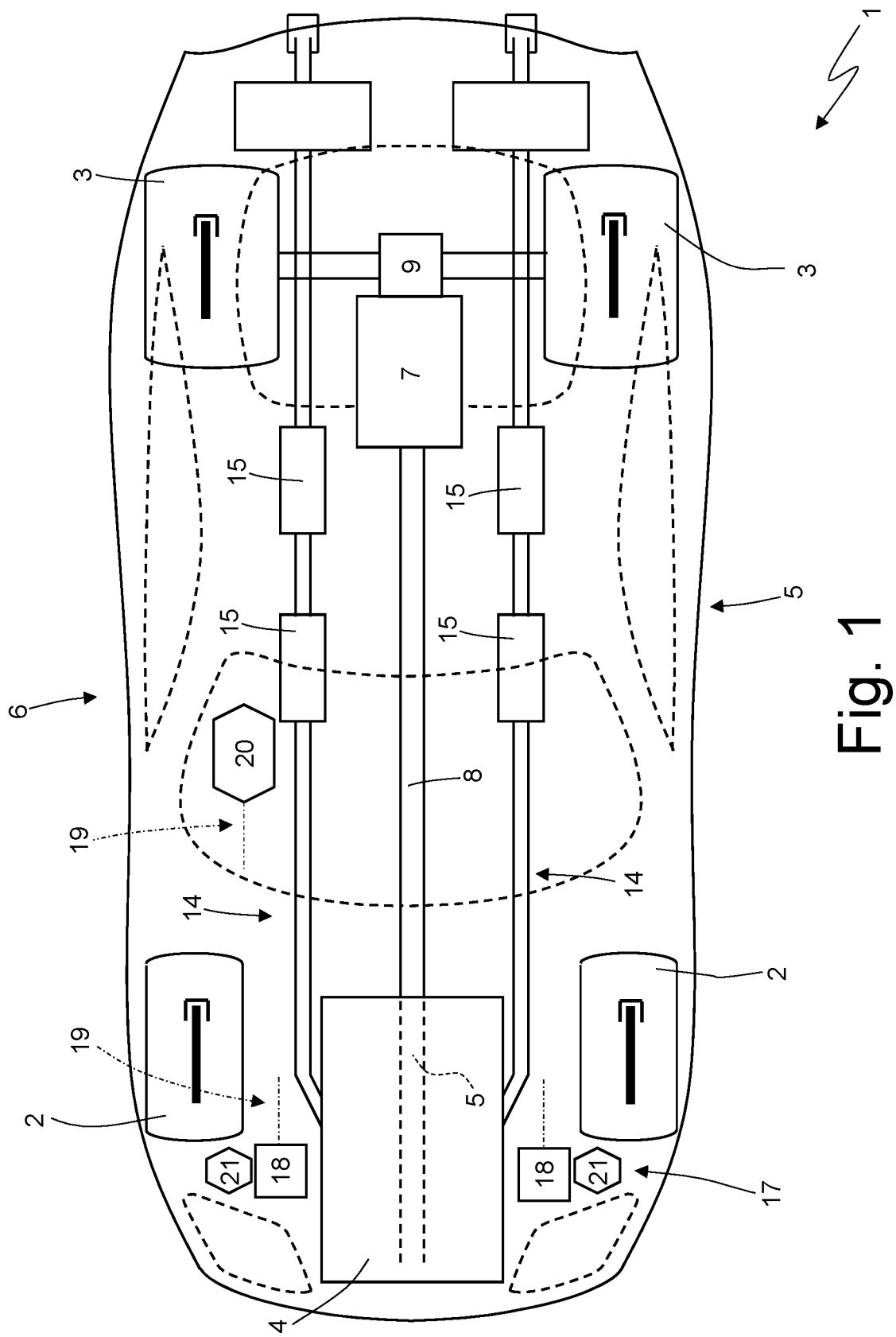
FIG. 1 is a schematic view of a car, which is provided with an internal combustion engine and implements the control method according to the invention.

In FIG. 1, number 1 indicates, as a whole, a road vehicle (in particular, a car) provided with two front driven (namely, non-drive) wheels 2 and with two rear drive wheels 3. In a front position there is an internal combustion engine 4, which constitutes the driving unit of the car 1, is provided with a drive shaft 5 and produces a torque, which is transmitted to the drive wheels 3 by means of a drivetrain 6. In particular, the internal combustion engine 4 is a spark-ignition engine, operates according to an Otto cycle and uses petrol as a fuel. The drivetrain 6 comprises a dual-clutch, servo-assisted transmission 7 arranged in the rear-wheel-drive assembly and a transmission shaft 8, which connects the drive shaft 5 to an input of the dual-clutch, servo-assisted transmission 7. The dual-clutch, servo-assisted transmission 7 is connected, in a train-like manner, to a self-locking differential 9, from which a pair of axle shafts start, each integral to a drive wheel 3.

According to FIG. 2, the internal combustion engine 4 is a "V12" and has two (twin) banks 10 of six cylinders 11 (schematically shown in FIG. 3) arranged at an angle relative to one another so as to form a 90° "V". In each bank 10, the six cylinders 11 are connected to an intake manifold 12 by means of at least one respective intake valve (not shown) and to an exhaust manifold 13 by means of at least one respective exhaust valve (not shown); each exhaust manifold 13 collects the gases produced by the combustion, which cyclically flow out of the exhaust valves.

According to FIG. 1, each exhaust manifold 13 is connected to a corresponding exhaust duct 14, which receives the gases produced by the combustion from the exhaust manifold 13 and releases them into the atmosphere. Each exhaust duct 14 originates from the corresponding exhaust manifold 13 and ends in the area of the tail of the car 1. Along each exhaust duct 14 there are known exhaust gas treatment devices 15: there always is at least one catalytic converter and there could also be a particulate filter (in order to comply with new EURO6C standards on polluting emissions, car manufacturers use a particulate filter called GPF, which stands for "Gasoline Particulate Filter"—also in gasoline engines).

At the end of each exhaust duct 14 there is a silencer provided with an outlet pipe, which constitutes the end part of the exhaust duct 14. Each outlet pipe is generally coupled to a decorative tail pipe, which only fulfils decorative functions (namely, masking the outlet pipe with a pleasant shape, which also matches the setting of the car 1).

According to FIG. 3, the internal combustion engine 4 comprises a fuel supply system, which, for each cylinder 11, comprises (at least) a corresponding injector 16, which feeds fuel into the cylinder 11.

According to FIG. 1, there is provided a control system 17 for the internal combustion engine 4 comprising two twin electronic control units 18, which are physically independent of and separate from one another, are connected to one another through a field BUS 19 (generally operating according to the CAN standard—"Controller Area Network") and each control a corresponding bank 10. An electronic control unit 18 operates as "master" (namely, sets the targets of the engine control), whereas the other electronic control unit 18 operates as "slave" (namely, copies the targets of the engine control set by the other electronic control unit 18).

According to FIG. 1, the car 1 comprises a known traction control system 20, which is normally identified with the acronym ASR ("Anti-Slip Regulation" or "Anti-Spin Regulation") or with the acronym TCS ("Traction Control System"). The traction control system 20 communicates through the field BUS 19 (also with the control system 17 of the internal combustion engine 4) and, in use, cyclically measures the rotational speed of each wheel 2 or 3 and compares the rotational speeds of all wheels 2 and 3; if a drive wheel 3 rotates faster than the other wheels 2 and 3 (especially the driven wheels 2), a slid is identified, which is countered (if necessary) by basically reducing the torque generated by the internal combustion engine 4. The reduction of the torque is obtained by reducing the supply of air (namely, by closing the throttle valves) and, as a consequence, by reducing the supply of fuel by the same quantity (in order to keep the air/fuel ratio constant). The reduction of the torque can also be obtained by acting, in the first instants (in order to have a quicker intervention), upon the spark advance; however, the action upon the spark advance is only temporary (as mentioned above, only in the first instants) and is progressively eliminated as the effect of the reduction of the air and fuel supply increases.

In other words, the traction control system 20 detects a slip of at least one drive wheel 3 and, in case of slip of at least one drive wheel 3, properly decreases, in a known manner, the torque generated by the internal combustion engine 4 in order to eliminate the slip or maintain the slip at a predetermined and desired level.

Furthermore, the car 1 comprises a signalling system 21, which controls, only during a slip of at least one drive wheel 3, the driving unit of the car 1 (namely, the internal combustion engine 4) with an unbalanced signalling law in order to obtain a cyclic operating irregularity, which generates an abnormal (namely, normally absent) vibration that can be perceived by the driver and an abnormal (namely, normally absent) noise that can be perceived by the driver. The abnormal vibration and the abnormal noise can be perceived by the driver, namely are intense enough to be (clearly) perceived by the driver (in fact, their very purpose, as better described below, is that of being perceived by the driver in order to provide the driver with a piece of information). In other words, only during a slip of at least one drive wheel 3, the driving unit is controlled with the signalling law, which is independent of the (possible) limiting action, adds to the (possible) limiting action in an autonomous manner and causes the driving unit to operate in an abnormal (unbalanced) manner so as to generate (through a cyclic operating irregularity) an abnormal vibration and/or an abnormal noise that can be perceived by the driver.

As a consequence, when the drive wheels 3 are slipping (regardless of whether the traction control system 20 is activated—or not—in order to reduce the torque, since the traction control system 20 could also have been dampened or disabled by the driver), the signalling system 21 acts upon the driving unit of the car 1 in order to obtain a cyclic operating irregularity, which generates an abnormal (namely, normally absent) vibration that can be perceived by the driver and an abnormal (namely, normally absent) noise that can be perceived by the driver; thanks to the abnormal vibration and to the abnormal noise, the driver realizes that his/her current driving has led to a slip of the drive wheels 3 and, hence, can correct his/her driving (if his/her goal was not to reach a slip of the drive wheels 3, which usually determines a worsening of performances) or, anyway, adjust his/her driving to the new condition (if his/her goal was to reach a controlled slip of the drive wheels 3 for a driving that prefers fun instead of performances).

It should be pointed out that the signalling system 21 acts, when the drive wheels 3 are slipping, upon the driving unit of the car 1 in order to generate the abnormal vibration and the abnormal noise regardless of the fact that the traction control system 20 reduces the torque (to eliminate or control the slip); the abnormal vibration and the abnormal noise warn the driver that his/her driving has caused a slip of the drive wheels 3 (possibly eliminated or controlled by the reduction of the torque) and this warning is useful both when the traction control system 20 reduces the torque (because, in this case, the normal effects of the slip of the drive wheels 3 are more or less masked by the intervention of the traction control system 20) and when the traction control system 20 does not reduce the torque (namely, is "off") since, in this situation, the driver could not be able to realize anyway that the slip of the drive wheels 3 is taking place. In other words, the traction control system 20, during a slip of at least one drive wheel 3, can or cannot reduce a torque generated by the driving unit (namely, by the internal combustion engine 4) completely independently of the action of the signalling device 21, which actuates the unbalanced signalling law (which fulfils the sole function of generating the abnormal vibration and the abnormal noise).

According to an alternative embodiment, the signalling system 21 intervenes by actuating the unbalanced signalling law only simultaneously with the intervention of the traction control system 20, namely only when the traction control system 20 intervenes to limit the torque.

The actuation of the unbalanced signalling law serves the sole purpose of generating the abnormal vibration and the abnormal noise in order to provide the driver with a suitable feedback on the presence of a slip of the drive wheels 3; as described more in detail below, the actuation of the unbalanced signalling law could even cause a (small and marginal) reduction of the torque, anyway disturbing the regular operation of the driving unit (namely, of the internal combustion engine 4), but this (small and marginal) reduction of the torque is a "side effect" that is not expressly wanted and pursued (even though this "side effect" is not harmful in any way as it tends to reduce, even if in a minimal and almost insignificant manner, the slip of the drive wheels 3, which is anyway a generally negative and undesired phenomenon). In fact, the reduction of the torque caused by the unbalanced signalling law generally is in the range of a few percentages and, therefore, it has no significant (meaningful) effect on the slip of the drive wheels 3.

In other words, in use, a desired torque requested by a driver of the road vehicle 1 is determined (mainly as a function of a position of an accelerator pedal), a slip of at least one drive wheel 3 is cyclically detected, the driving unit is controlled, in the absence of a slip of the drive wheels 3, so as to generate a normal torque equal to the desired torque and, on the other hand, the driving unit, only during a slip of at least one drive wheel 3, is controlled so as to generate a reduced torque, namely smaller than the desired torque, due to the intervention of the traction control system 20 (obviously, only when the traction control system 20 actually intervenes).

Hence, only during the slip of at least one drive wheel 3, a reduction of the torque generated by the driving unit relative to the desired torque is obtained through a limiting action (imparted by the traction control system 20), which acts upon the driving unit and maintains a regular and balanced operation of the driving unit (since the limiting action is applied to all cylinders 11 in the same identical manner and simultaneously, namely the limiting action entails acting upon all cylinders 11 in the same instant and in the same manner); as explained above, this limiting action (imparted by the traction control system 20) always entails a reduction of the air flow rate and could also entail (only in the first instants) a temporary intervention upon the spark advance.

Furthermore, only during the slip of at least one drive wheel 3 and regardless of the action of the traction control system 20 (namely, independently of the reduction of the torque generated by the driving unit), the signalling system 21 also controls the driving unit with an unbalanced signalling law, which is completely independent of the limiting action, adds to the limiting action in an autonomous manner (if the limiting action is present) and causes a cyclic operating irregularity, which generates an abnormal vibration and/or an abnormal noise (which have nothing to do with the reduction of the torque determined by the limiting action).

According to a preferred embodiment, the limiting system 21 keeps a (main, namely first harmonic) time frequency of the abnormal vibration and of the abnormal noise constant even as a rotational speed ω of the driving unit (namely, of the internal combustion engine 4) changes; in other words, the limiting system 21 controls the driving unit (namely, the internal combustion engine 4) with the unbalanced signalling law, which is constantly adjusted to the rotational speed ω of the driving unit, so that the (main, namely first harmonic) time frequency of the abnormal vibration and of the abnormal noise is constant. The term time frequency indicates the number of events that are repeated in a given time unit, namely the frequency assessed based on time.

In other words, the desired time frequency of the abnormal vibration and of the abnormal noise is always the same regardless of the rotational speed ω of the driving unit, whereas the actuation of the abnormal vibration and of the abnormal noise (carried out with the target of the desired time frequency) could not be able to exactly obtain the desired time frequency (i.e., due to the impossibility of perfectly carrying out the control, the actual time frequency could be slightly different from the desired time frequency).

Keeping the (main, namely first harmonic) time frequency of the abnormal vibration and of the abnormal noise constant improves the feedback perceived by the driver, who expects that the same type of event (the slip of the drive wheels 3) always corresponds to the same type of message regardless of the rotational speed ω of the driving unit; namely, from the driver's point of view, it makes no sense that the feedback signalling the slip of the drive wheels 3 has to be heavier only because the driving unit rotates more slowly and has to be more acute only because the driving unit rotates more quickly.

Figure 5:
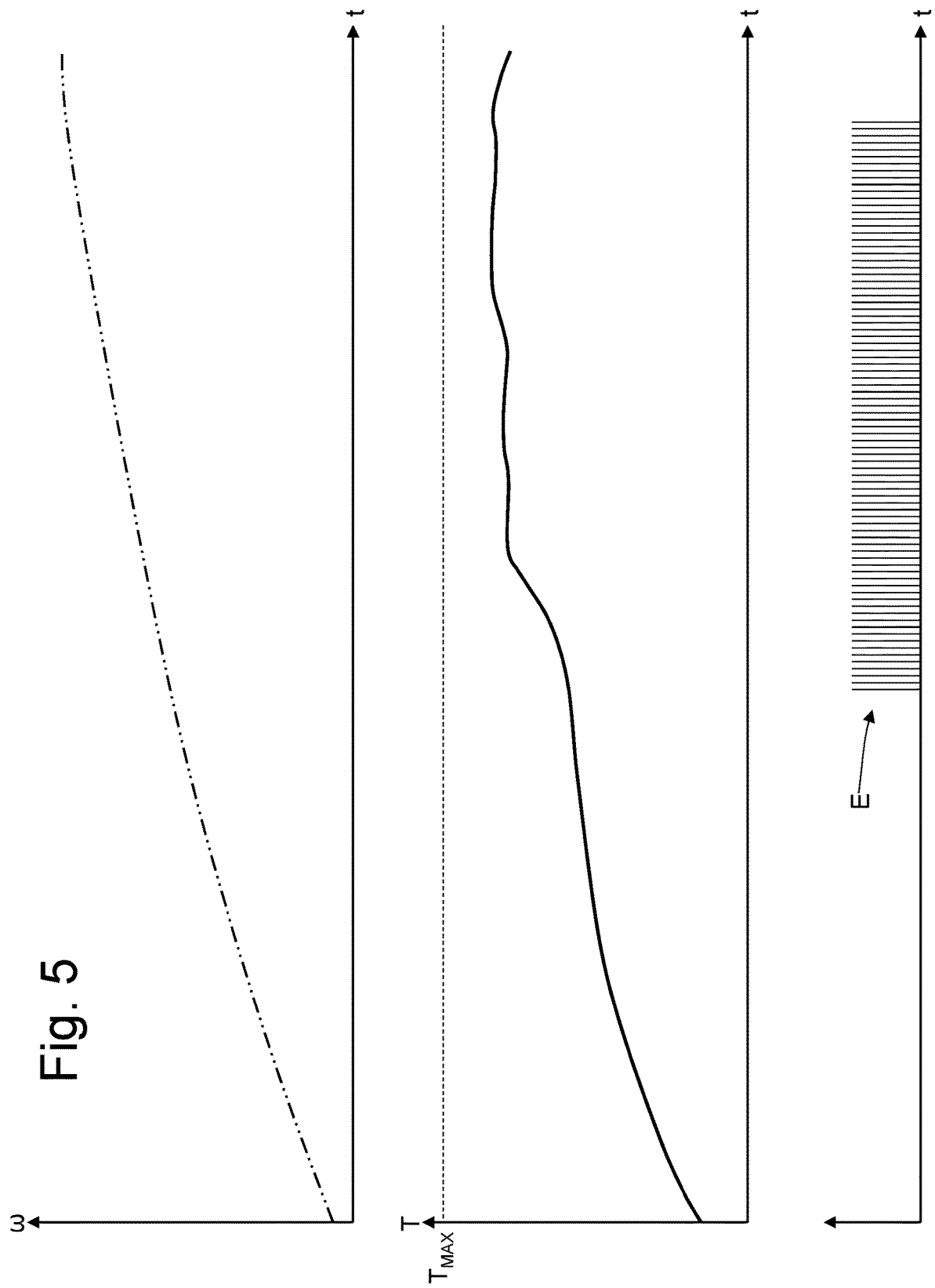
FIG. 5 is time diagram showing the development over time of some characteristic quantities of the internal combustion engine of FIG. 2 during the execution of the method according to the invention.

In particular, the unbalanced signalling law entails cyclically operating an impulsive deviating event E (shown in FIG. 5), which generates the abnormal vibration and the abnormal noise and has a constant time frequency even as the rotational speed ω of the driving unit changes (as shown in FIG. 5); the time frequency of the impulsive deviating event E is, as a consequence, a submultiple of the time frequency of the abnormal vibration and of the abnormal noise. According to a preferred, though non-binding embodiment, the time frequency of the deviating event E ranges from 5 to 32 Hz; obviously, according to other embodiments, other time frequency ranges are possible (also depending on the constructive features of the driving unit and of the car 1). According to a preferred embodiment, the time frequency of the impulsive deviating event E is not a multiple or submultiple of a resonant frequency of components of the driving unit or of the car 1 in order to avoid creating excess mechanical stresses, which might lead to excess wear or even breaking.

According to a possible embodiment, the limiting system 21 estimates the time frequency range within which the abnormal vibrations (generated by the deviating events E) develop and makes sure that the time frequency range within which the abnormal vibrations develop does not include the resonant frequencies of the mechanical members of the drivetrain 6 (namely, of the mechanical members elastically-dynamically connected to the internal combustion engine 4 in the entire chain of distribution of the torque delivered by the internal combustion engine 4 up to the drive wheels 3). If the time frequency range within which the abnormal vibrations develop includes the resonant frequencies of the mechanical members of the drivetrain 6, the limiting system 21 changes (a slight change normally is sufficient) the time frequency of the deviating event E in order to prevent the time frequency range within which the abnormal vibrations develop from including resonant frequencies of the mechanical members of the drivetrain 6. According to a possible embodiment, the limiting system 21 uses a mathematical model consisting of equations or maps to calculate the time frequency range within which the abnormal vibrations develop; alternatively, the limiting system 21 stores, in a suitable memory, which the resonant frequencies of the mechanical members of the drivetrain 6 are.

According to a possible embodiment, as further safety control during the generation of the abnormal vibrations (generated by the deviating events E), the limiting system 21 controls the signal provided by one or more accelerometers (or other vibration sensors) present in the internal combustion engine 4 or in the rest of the car 1 (for example, in the transmission 7) in order to make sure that the abnormal vibrations (generated by the deviating events E) do not correspond to abnormal vibration peaks (which indicate a possible triggering of a mechanical resonance). If the system 21 finds out that there are abnormal vibration peaks around the abnormal vibrations (generated by the deviating events), it changes (a slight change normally is sufficient) the time frequency of the deviating event E.

As mentioned above, the desired time frequency of the deviating events E (hence, of the abnormal vibration and of the abnormal noise) is always the same regardless of the rotational speed ω of the driving unit; obviously, the actuation of the abnormal events E (carried out with the target of the desired time frequency) could not be able to exactly obtain the desired time frequency (i.e., due to the impossibility of perfectly carrying out the control, the actual time frequency of the deviating events E could be slightly different from the desired time frequency of the deviating events E).

In case the time frequency of the deviating event E ranges from 5 to 32 Hz, the deviating event E has to be actuated 5 to 32 times each second; furthermore, an internal combustion engine 4 with twelve cylinders 11 running at 6,000 revolutions/minute (the drive wheels 3 hardly lose grip when the internal combustion engine 4 is close to its minimum rpm) performs 600 combustion cycles each second and, hence, has 600 possibility every second to carry out a deviating event E. Therefore, having 600 combustion cycles available each second when the engine runs at 6,000 revolutions/minute, it is relatively simple to actuate the deviating events E, so that the actual time frequency of the deviating event E is substantially identical to the desired time frequency of the deviating event E (for example, ranging from 5 to 32 Hz).

According to a possible embodiment, the limiting system 21 determines a degree of slip of the drive wheels 3 and, hence, modulates an intensity of the abnormal vibration and an intensity of the abnormal noise depending on the degree of slip of the drive wheels 3, so that the higher the degree of slip of the drive wheels 3, the more intense the abnormal vibration and the abnormal noise.

For example, the degree of slip of the drive wheels 3 could be measured through the slip S of the drive wheels 3, which is calculated by means of the following equation:

$$S=(\omega_3-\omega_2)/\omega_2$$

ω₂ rotational speed corresponding to a longitudinal speed of the car 1 (for example, determined based on the rotational speed of the front driven wheels 2);
ω₃ rotational speed of the drive wheels 3;
S slip of the drive wheels 3.

As mentioned above, the unbalanced signalling law entails cyclically actuating an impulsive deviating event E, which preferably determines an impulsive gap in the torque generated by the driving unit (namely, by the internal combustion engine 4).

When the driving unit is the internal combustion engine 4, the impulsive deviating event E consists of a failed (possibly incomplete) fuel injection (technically known as "cut-off") in (at least) one single cylinder 11, which determines a failed (possible incomplete) combustion in the cylinder 11 followed by a variable number of normal injections (technically known as "firing") in the following cylinders 11 (namely, where the combustion has to take place according to the ignition sequence of the internal combustion engine 4), which determine a normal combustion in the following cylinders 11. The combination, in the predetermined sequence, of the number of failed fuel injections ("cut-off") and of normal fuel injections ("firing") generates the intensity and the time frequency of the abnormal vibration and of the abnormal noise; in order to obtain a high time frequency of the impulsive deviating event E (hence, a high time frequency of the abnormal vibration and of the abnormal noise), a failed fuel injection is actuated in one single cylinder 11 (so as to have a complete lack of combustion on the cylinder 11) followed by a smaller number of normal injections in the following cylinders 11, whereas, in order to obtain a smaller time frequency of the impulsive deviating event E (hence, a smaller time frequency of the abnormal vibration and of the abnormal noise), a failed fuel injection is actuated in one single cylinder 11 (so as to have a complete lack of combustion in the cylinder 11) followed by a larger number of normal injections in the following cylinders 11. In order to obtain a higher intensity of the impulsive deviating event E, the impulsive deviating event E could be a consecutive failed injection in several cylinders 11, instead of one single cylinder 11, namely the impulsive deviating event E could be a consecutive failed injection, besides in the first cylinder 11, in one or even more of the cylinders firing after the first cylinder 11 according to the predetermined ignition sequence.

Preferably, the actuation of an impulsive deviating event E, namely a failed injection in one single cylinder 11 (so as to have a complete lack of combustion in the cylinder 11) is always followed by a large number of (at least fifteen) normal injections in the following cylinders 11, since the impulsive deviating event E (i.e. the failed injection in one single cylinder 11) has the only aim of generating a warning for the driver and does not want to significantly "disturb" the regular and balanced operation of the driving unit.

According to a preferred embodiment, the limiting system 21 makes sure that the use of the unbalanced signalling law does not determine an excess increase in an inner temperature T of the catalytic converters 15 present along the exhaust ducts 14 of the internal combustion engine 4 and forbids (from the very beginning) or interrupts (after the beginning) the use of the unbalanced signalling law if the use determines an excess increase in the inner temperature of the catalytic converters 15.

Indeed, the slip of the drive wheels 3 is generally obtained when the internal combustion engine 4 generates a significant torque while operating in transient (namely, with a continuously evolving operating point) and, in these conditions, there is a certain quantity of unburnt fuel (since, in order to reduce the maximum temperature of the cylinders 11, fat mixtures with excess fuel are used); the succession of impulsive deviating events E (namely, of failed fuel injections) operated by the unbalanced signalling law introduces, into the exhaust ducts 14, excess oxygen, which determines an immediate and violent combustion of the fuel located in the catalytic converters 15 (with a significant rise in the inner temperature of the catalytic converters 15). The inner temperature T of the catalytic converters 15 can never exceed a maximum safety value $T_{MAX}$ (generally equal to circa 940-960° C.) in order to avoid causing permanent damages to the catalytic converters 15.

According to a possible embodiment, the limiting system 21 estimates the inner temperature T of the catalytic converters 15 present along the exhaust ducts 14 of the internal combustion engine 4 and forbids or interrupts the use of the unbalanced signalling law if the inner temperature T of the catalytic converter 15 exceeds a guarantee threshold (properly lower than the maximum safety value $T_{MAX}$). For example, the limiting system 21 could estimate the inner temperature T of the catalytic converters 15 by using a mathematical model (consisting of equations or maps) and depending on an operating point of the internal combustion engine 4 and on a torque reserve (the operating point of the internal combustion engine 4 consists of the rotational speed $\omega$ and of the load).

According to a possible embodiment, the limiting system 21 waits for a resting amount of time, starting from the end of a previous use of the unbalanced signalling law, before enabling a new and following use of the unbalanced signalling law; namely, after the unbalanced signalling law has been used during a slip of the drive wheels 3, a resting amount of time has to elapse before the unbalanced signalling law can be used again (even in the presence of a slip of the drive wheels 3 which will not be "signalled" to the driver, as preserving the integrity of the catalytic converters 15 is more important than giving a feedback of this type to the driver).

The resting amount of time allows the catalytic converters 15 to cool down and can have both a constant duration and a variable duration, depending on the duration of the previous use of the unbalanced signalling law (the more the previous use of the unbalanced signalling law lasted, the more the resting amount of time has to last).

In the embodiment shown in FIGS. 1, 2 and 3, the internal combustion engine 4 comprises two banks 10, each with (six) cylinders 11, and two control units 18, each associated with a corresponding bank 10 and controlling all and the sole injectors 16 of its own bank 10. Each control unit 18 actuates the unbalanced signalling law completely independently of and autonomously from the other control unit 18; in other words, each control unit 18 (hence, both the master control unit 18 and the slave control unit 18) implements a signalling system 21 of its own (namely, contains, on the inside, the software creating the signalling system 21), which is completely independent of and autonomous from the signalling system 21 of the other control unit 18 and operates completely independently of and separately from (namely, without any exchange of information) the signalling system 21 of the other control unit 18. Obviously, the two signalling systems 21 implemented in the two control units are perfectly identical, namely are completely twin systems.

The signalling system 21 of each control unit 18 autonomously decides, namely without "consulting" with the signalling system 21 of the other control unit 18 in any way, the beginning and the end of the actuation of the unbalanced signalling law only based on the values of the parameters read in the field BUS 19; namely, it autonomously decides when the unbalanced signalling law has to be activated and when the unbalanced signalling law has to be deactivated. In other words, the signalling system 21 of each control unit 18, by only consulting the information available in the field BUS 19, starts (when the slip of the drive wheels 3 begins) and subsequently stops (when the slip of the drive wheels 3 stops) the actuation of the unbalanced signalling law, completely ignoring what the signalling system 21 of the other control unit 18 is doing (or not doing).

The hardware (of the two control units 18) is identical, the software (the two signalling systems 21 implemented in the two control units 18) is identical and the information received from the field BUS 19 is exactly the same (since there is one single field BUS 19 for the entire car 1); as a consequence, even if the two signalling systems 21 implemented in the two control units 18 do not communicate with one another in any way, they act anyway in a substantially synchronized manner as they both have the same reactions with the same times to the same stimuli. Namely, two completely identical entities from the hardware point of view and from the software point of view (namely, the two signalling systems 21 implemented in the two control units 18) react to the same inputs (deriving from the same field BUS 19) with the same actions and with the same times. Therefore, it is possible to obtain a substantial synchronization of the actions of the two signalling systems 21 even in the absence of any form of communication between the two signalling systems 21.

Indeed, the two control units 18 communicate with one another through the field BUS 19, which, however, is not quick enough to permit an adequate synchronization of the impulsive deviating events E, which are particularly quick; hence, with the field BUS 19 it would not be possible to synchronize the actions of the two signalling systems 21 because the dynamic of the impulsive deviating events E (in the range of a few milliseconds when the rotational speed $\omega$ is high) is much faster than the communication delays set by the field BUS 19 (in the range of 10-20 milliseconds). This limit of the field BUS 19 (which does not allow the field BUS 19 to be used to synchronize the action of the two signalling systems 21) is completely overcome, making the two signalling systems 21 perfectly identical and completely autonomous from one another, namely thanks to the fact that both control units 18 (i.e. both the master control unit 18 and the slave control unit 18) actuate the unbalanced signalling law in their own bank 10 of cylinders 11 completely independently of and autonomously from the other control unit 18. In other words, having the two control units 18 actuate the unbalanced signalling law in an independent manner makes a punctual synchronization through the field BUS 19 no longer necessary and, as a consequence, "timing" problems deriving from an insufficient communication speed of the field BUS 19 are avoided.

To sum up, the two signalling systems 21 implemented in the two master and slave control units 18 independently set the beginning (and the end) of the actuation of the unbalanced signalling law depending on the presence of a slip of the drive wheels 3 (established based on the information read in the field BUS 19); the two signalling systems 21 implemented in the two master and slave control units 18 are able to start the actuation of the unbalanced signalling law substantially in the same instant because of the actuation conditions that both control units control in parallel and that are identical for both control units.

The intervention of the two signalling systems 21 can depend not only on the loss of traction of at least one drive wheel 3, but also on other conditions; namely, the signalling systems 21 can be allowed to intervene (namely, actuate the unbalanced signalling law) only if the loss of traction of at least one drive wheel 3 occurs together with other events. For example, the signalling systems 21 can be allowed to intervene (namely, actuate the unbalanced signalling law)

only if the loss of traction of at least one drive wheel 3 occurs together with a non-zero steering angle of the front wheels 2 (namely, only when the car 1 is driving along a bend); indeed, the slip of the drive wheels 3 has no particular negative effect when driving along a straight path (except for the reduction of performances), whereas the slip of the drive wheels 3 along a bend can trigger a power oversteering that can lead to a 180° spin. For example, the signalling systems 21 can be allowed to intervene (namely, actuate the unbalanced signalling law) only if the accelerator pedal is past a given position (namely, was strongly pressed by the driver). For example, the signalling systems 21 can be allowed to intervene (namely, actuate the unbalanced signalling law) only if the rotational speed ω of the internal combustion engine 4 exceeds a given threshold.

Between the two control units 18 there normally are exchanges of messages through the field BUS 19 (for example, the signal of the position of the accelerator pedal is controlled by the sole master control unit 18 and needs to be sent to the slave control unit 18 through the field BUS 19, namely the master control unit 18 makes it available on the field BUS 19); if a signal generated and made available on the field BUS 19 by the master control unit 18 becomes part of the assessment of the activation (deactivation) of the actuation of the unbalanced signalling law (for example, the signal of the position of the accelerator pedal), the signalling system 21 implemented in the master control unit 18 applies, to this signal, a standard and predetermined time delay which is equal to the communication time delay of this signal in the field BUS 19, so as to be in the same time conditions as the signalling system 21 implemented in the slave control unit 18. Namely, if the master control unit 18 processes a control parameter, which it publishes in the field BUS 19, is read by the slave control unit 18 and is used by both control units 18 to decide the beginning or the end of the actuation of the signalling law, the master control unit 18 applies, to the control parameter, a time delay equal to the communication time delay in the field BUS 19, when it uses the control parameter to decide the beginning or the end of the actuation of the signalling law (by so doing, it puts itself in the same identical conditions as the slave control unit 18).

The signalling systems 21 independently act upon both banks 10; in this way, the incomplete or failed fuel injections (namely, the impulsive deviating events E) take place in an alternated manner in the cylinders 11 of the two banks 10, thus preventing the incomplete or failed fuel injections from occurring all in the cylinders 11 of a same bank 10, hence causing an excess overheating of the catalytic converters 15 of the corresponding exhaust duct 14 and/or abnormal mechanical stresses of the crank mechanism and of the mechanical connection members.

According to a possible embodiment, the two signalling systems 21 (which are identical to one another, namely use the same algorithms) act with the same timing and, hence, always actuate the same incomplete or failed fuel injections (namely, the same impulsive deviating events E) substantially in the same instant in both banks 10 (obviously, taking into account the predefined ignition sequence); namely, when an incomplete or failed fuel injection takes place in a cylinder 11 of a bank 10, an identical incomplete or failed fuel injection also takes place in a cylinder 11 of the other bank 10, which "fires" immediately after (based on the predefined ignition sequence); this is an actuation possibility that prefers a greater signalling intensity (always generating the incomplete or failed fuel injections in two cylinders 11 that "fire" one after the other according to the predefined ignition sequence).

According to an alternative embodiment, the two signalling systems 21 (which are identical to one another, namely use the same algorithms) act with a different timing, namely a signalling system 21 acts with a different timing relative to the other signalling system 21, so that an incomplete or failed fuel injection in a cylinder 11 of a bank 10 is always followed by a given number of normal injections in the cylinders 11 of both banks 10 (according to the predefined ignition sequence), namely, so that between two incomplete or failed fuel injections in a cylinder 11 of a bank 10 there is an incomplete or failed fuel injection in a cylinder 11 of the other bank 10 (in particular, the incomplete or failed fuel injection in a cylinder 11 of a bank 10 substantially is halfway between two incomplete or failed fuel injections in a cylinder 11 of the other bank 10).

If the time frequency of the impulsive deviating event E (namely, of the incomplete or failed fuel injection in at least one cylinder 11) has to be kept (approximately) constant (even as the rotation speed ω or the driving unit changes), each signalling system 21 determines, based on the desired time frequency of the impulsive deviating event E and based on the rotational speed ω of the driving unit, the number of regular ignitions that have to occur between an impulsive deviating event E (namely, an incomplete or failed fuel injection in at least one cylinder 11) and the following impulsive deviating event E.

If the two signalling systems 21 act with the same timing, each signalling system 21 actuates, without delay (namely, in a substantially instantaneous manner, without any delay, i.e. as soon as possible), a first impulsive deviating event (namely, an incomplete or failed fuel injection in at least one cylinder 11 of its own bank 10) and repeats the impulsive deviating event E (namely, an incomplete or failed fuel injection in at least one cylinder 11 of its own bank 10) with a time frequency that is identical to the desired time frequency of the impulsive deviating event E; it should be pointed out that, if the desired time frequency of the impulsive deviating event E has to be kept constant, the same desired time frequency translates into a greater number of ignitions when the rotational speed ω of the internal combustion engine 4 is higher and translates into a smaller number of ignitions when the rotational speed ω of the internal combustion engine 4 is smaller. As a consequence, the two signalling systems 21 act together with the same timing and, hence, the two impulsive deviating events E generated by the two signalling systems 21 are consecutive, thus being perceived as one single impulsive deviating event E with a greater (double) intensity, which takes place with the desired time frequency.

If the two signalling systems 21 act with a different timing, a signalling system 21 (for example, implemented in the master control unit 18) actuates, without delay (namely, in a substantially instantaneous manner, without any delay, i.e. as soon as possible), a first impulsive deviating event (namely, an incomplete or failed fuel injection in at least one cylinder 11 of its own bank 10) and repeats the impulsive deviating event E (namely, an incomplete or failed fuel injection in at least one cylinder 11 of its own bank 10) with a time frequency that is half the desired time frequency of the impulsive deviating event E; it should be pointed out that, if the desired time frequency of the impulsive deviating event E has to be kept constant, the same desired frequency translates into a greater number of ignitions when the rotational speed ω of the internal combustion engine 4 is higher and translates into a smaller number of ignitions when the rotational speed ω of the internal combustion engine 4 is smaller. On the other hand, the other signalling system 21 (for example, implemented in the slave control unit 18) actuates a first impulsive deviating event (namely, an incomplete or failed fuel injection in at least one cylinder 11 of its own bank 10) with a delay corresponding to the desired time frequency of the impulsive deviating event E and repeats the impulsive deviating event E (namely, an incomplete or failed fuel injection in at least one cylinder 11 of its own bank 10) with a time frequency that is half the desired time frequency of the impulsive deviating event E; it should be pointed out that, if the desired time frequency of the impulsive deviating event E has to be kept constant, the same desired time frequency translates into a greater number of ignitions when the rotational speed ω of the internal combustion engine 4 is higher and translates into a smaller number of ignitions when the rotational speed ω of the internal combustion engine 4 is smaller. As a consequence, the two signalling systems 21 act with a different timing and the time difference is equal to the desired time frequency of the impulsive deviating event E so that, overall, there is an impulsive deviating event E taking place with the exact desired time frequency of the impulsive deviating event E (alternatively, an impulsive deviating event E is actuated in the right bank 10, whereas the following impulsive deviating event E is actuated in the left bank 10).

Hereinafter a numerical example of the actuation of the unbalanced signalling law will be discussed, both in case the two signalling systems 21 act with the same timing and in case the two signalling systems 21 act with a different timing.

With reference to the numbers of the cylinders 11 shown in FIG. 4, the ignition sequence of the twelve cylinders 11 of the two banks 10 could be "1-7-5-11-3-9-6-12-2-8-4-10" (namely, alternating the ignition of the cylinders 11 of the two banks 10); this obviously is just an example of the ignition sequence of the twelve cylinders 11 and other ignition sequences are possible.

Assuming that the conditions of loss of grip of the drive wheels 3 requires the actuation of the unbalanced signalling law, that the desired time frequency of the impulsive deviating event is 25 Hz and that the rotational speed ω of the internal combustion engine 4 is 3000 revolutions/minutes (equal to 50 revolutions/second), an impulsive deviating event E has to be generated 25 times per second; with every two complete revolutions of the drive shaft, the ignitions are normally carried out in all twelve cylinders 11 and, hence, at 50 revolutions/second, there are on the whole (in normal conditions, namely without the impulsive deviating events E) 300 ignitions in the twelve cylinders 11 every second. In order to have a desired time frequency of the impulsive deviating event E equal to 25 Hz, an impulsive deviating event E has to be actuated every twelve theoretical ignitions (namely, that would take place in normal conditions in the absence of the actuation of the unbalanced signalling law) in all twelve cylinders 11.

According to a possible embodiment, the two signalling systems 21 act with the same timing; hence, when the unbalanced signalling law has to be actuated, the signalling system 21 implemented in the right control unit 18 immediately carries out the impulsive deviating event E with a failed or incomplete fuel injection, for example in the cylinder 11 number "1", subsequently followed by a normal fuel injection in the other cylinders 11 number "5-3-6-2-4", then again a failed or incomplete fuel injection in the cylinder 11 number "1" subsequently followed by a normal fuel injection in the other cylinders 11 number "5-3-6-2-4" and so on; similarly, when the unbalanced signalling law has to be actuated, the signalling system 21 implemented in the left control unit 18 immediately carries out the impulsive deviating event E with a failed or incomplete fuel injection in the cylinder 11 number "7" subsequently followed by a normal fuel injection in the other cylinders 11 number "11-9-12-8-10", then again a failed or incomplete fuel injection in the cylinder 11 number "7" subsequently followed by a normal fuel injection in the other cylinders 11 number "11-9-12-8-10" and so on (it should be pointed out that all of this takes place without any type of communication between the two signalling systems 21 implemented in the two control units 18).

To sum up, with every twelve theoretical ignitions (namely, that would take place in normal conditions in the absence of the actuation of the unbalanced signalling law), in all twelve cylinders 11 there is one single impulsive deviating event E (consisting of the failed or incomplete fuel injection in two cylinders 11 of the two banks 10 firing one after the other).

According to a different embodiment, the two signalling systems 21 act with a different timing; hence, when the unbalanced signalling law has to be actuated, the signalling system 21 implemented in the right control unit 18 (which could be the master control unit 18) immediately carries out the impulsive deviating event E with a failed or incomplete fuel injection, for example in the cylinder 11 number "1", subsequently followed by a normal fuel injection in the other cylinders 11 number "5-3-6-2-4" and by a normal fuel injection in all cylinders 11 of the right bank 10 (namely, in all cylinders "1-5-3-6-2-4"), then again a failed or incomplete fuel injection in the cylinder 11 number "1" subsequently followed by a normal fuel injection in the other cylinders 11 number "5-3-6-2-4" and so on; on the other hand, when the unbalanced signalling law has to be actuated, the signalling system 21 implemented in the left control unit 18 (which could be the slave control unit 18) applies a time difference and, hence, immediately carries out a normal fuel injection in all cylinders 11 of the left bank 10 (namely, in all cylinders "7-11-9-12-8-10") subsequently followed by a failed or incomplete fuel injection in the cylinder 11 number "7" and then by a normal fuel injection in the other cylinders 11 number "11-9-12-8-10", then again a normal fuel injection in all cylinders 11 of the left bank 10 (namely, in all cylinders "7-11-9-12-8-10") and so on (it should be pointed out that all of this takes place without any type of communication between the two signalling systems 21 implemented in the two control units 18).

To sum up, with every twelve theoretical ignitions (namely, that would take place in normal conditions in the absence of the actuation of the unbalanced signalling law), in all twelve cylinders 11 there is one single impulsive deviating event E (consisting of the failed or incomplete fuel injection one time in a cylinder 11 of the left bank 10 and the following time in a cylinder 11 of the right bank 10).

FIG. 5 shows the time development of the rotational speed ω of the internal combustion engine 4 and of the inner temperature T of the catalytic converters 15 during the actuation of the unbalanced signalling law; please note the sequence of impulsive deviating events (namely, of incomplete or failed fuel injections) having a constant time frequency even as the rotational speed ω of the internal combustion engine 4 increases and please note the increase in the inner temperature T of the catalytic converters 15 corresponding to the sequence of impulsive deviating events E.

In the embodiment shown in FIG. 1, 2 or 3, the driving unit of the car 1 is the internal combustion engine 4 and, therefore, the impulsive deviating events of the unbalanced signalling law are incomplete or failed fuel injections in the single cylinders 11.

Figure 6:
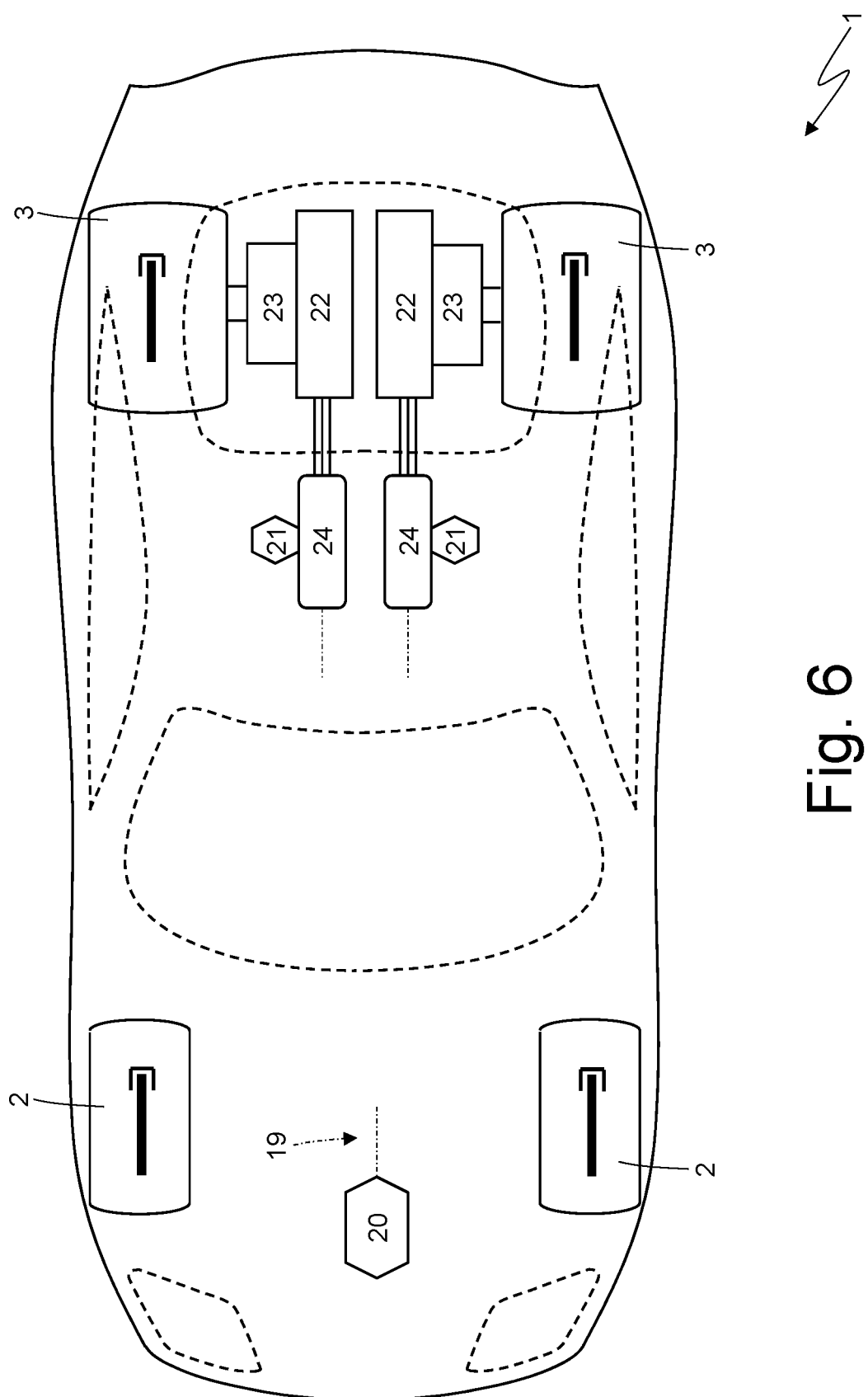
FIG. 6 is a schematic view of a car, which is provided with electric motors and implements the control method according to the invention.
Figure 7:
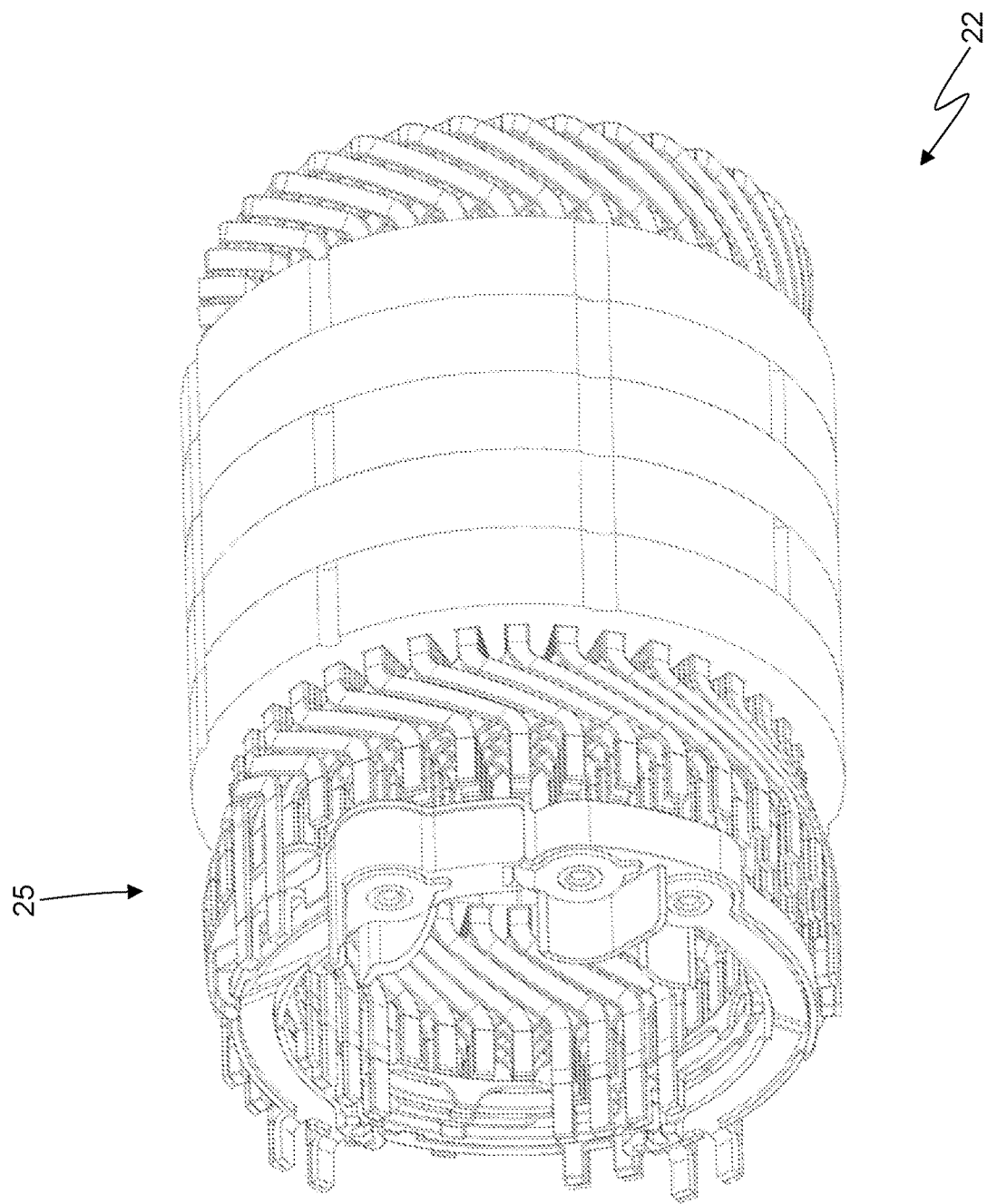
FIG. 7 is a schematic view of a stator winding of an electric motor of the car of FIG. 6.

In the embodiment shown in FIGS. 6 and 7, the driving unit of the car 1 consists of two electric motors 22, each connected to a corresponding rear drive wheel 3 by means of a mechanical drivetrain 23 (for example comprising an epicyclic gearing). Each electric motor 22 is controlled by a corresponding electronic power converter 24, which provides the corresponding stator winding 25 (which is schematically shown in FIG. 7) with an AC voltage. In this embodiment, the impulsive deviating event E could be an unbalanced power supply (obviously, for a very short amount of time) of the stator winding 25, for example by supplying one of the phases differently from the other phases.

The actuation of the unbalanced signalling law generally causes a cyclic operating irregularity, which generates both an abnormal (namely, normally absent) vibration that can be perceived by the driver and an abnormal (namely, normally absent) noise that can be perceived by the driver. However, according to other embodiments, the actuation of the unbalanced signalling law generally causes a cyclic operating irregularity, which generates either only an abnormal (namely, normally absent) vibration that can be perceived by the driver or only an abnormal (namely, normally absent) noise that can be perceived by the driver.

It should be pointed out that the vibrational and acoustic feedback given to the driver in case of slip of the drive wheels 3 can generally be activated and deactivated by the driver depending on the type of driving; indeed, this type of vibrational and acoustic feedback in case of slip of the drive wheels 3 is very useful and appreciated for high-performance driving on a track, but it is not equally useful for everyday driving on roads open to traffic, when the slip of the drive wheels 3 is very rare and due to local bad conditions of the road surface.

In the embodiment shown in the accompanying figures, the control method is applied to a car 1; according to other embodiments which are not shown herein, the control method is applied to a different type of road vehicle, such as for example a moped, a motorcycle, a van, a truck or a bus.

The embodiments described herein can be combined with one another, without for this reason going beyond the scope of protection of the invention.

The control method described above has different advantages.

First of all, the control method described above provides the driver with a feedback on the slip of the drive wheels 3 (namely, on the possible intervention of the traction control), which is very clear and well perceivable (namely, the driver cannot ignore it or mistake it for something else) and, at the same time, is also very "fun" (namely, fully corresponds to what the driver's emotional side expects from his/her car 1). To this regard, it should be pointed out that a high-performance sports car is basically appreciated for the extreme fun it can deliver and one of the main aspects to be taken into account in order to define a car as fun is the behaviour of the car in controlled slip. The control method described above increases the "fun to drive" of the car 1 in that it provides a vibrational feedback on the steering wheel and an acoustic feedback coming from the exhaust in conditions in which the internal combustion engine 4 normally is controlled in an "aphonic" ("aseptic") manner. Indeed, the driving "feeling" that can be reproduced thanks to the control method described above is that of a traction control of the Formula 1 prototypes of the early 2000s, which always was highly appreciated by high-performance sports car lovers.

Furthermore, the control method described above is extremely flexible and, hence, allows the abnormal vibration and the abnormal noise generated when the drive wheels 3 lose grip to be adjusted to the desires of the driver; furthermore, the control method described above allows the abnormal vibration and the abnormal noise generated when the drive wheels 3 lose grip to be modulated based on the degree of loss of grip (namely, the greater the loss of grip, the greater the intensity and the time frequency of the abnormal vibration and of the abnormal noise), so as to also provide the driver with a quantitative—and not only qualitative— indication of the loss of grip.

The method described above can easily be implemented also in the presence of an internal combustion engine 4 having two banks 10 of cylinders 11 controlled by two independent control units 18, efficiently and effectively overcoming the speed limits of the communication between the control units 18 through the field BUS 19.

Finally, the control method described above is extremely simple and economic to be implemented also in an existing car, since it does not require the installation of additional hardware to be added to the one already available in a modern car, a high processing capacity of the processors of the traction control system 20 or a large space in the memory of the traction control system 20.

LIST OF THE REFERENCE NUMBERS OF THE FIGURES 1 car
2 front wheels
3 rear wheels
4 engine
5 drive shaft
6 drivetrain
7 transmission
8 transmission shaft
9 differential
10 bank
11 cylinders
12 intake manifold
13 exhaust manifold
14 exhaust duct
15 exhaust gas treatment devices
16 injector
17 control system
18 control unit
19 field BUS
20 traction control system
21 signalling system
22 electric motor
23 mechanical drivetrain
24 electronic power converter
25 stator winding
co rotational speed
T temperature
$T_{MAX}$ maximum safety value
E deviating event
t time

The invention claimed is:

1. A method to control a road vehicle (1) during a slip of the drive wheels (3), which are caused to rotate by an internal combustion engine (4) provided with a plurality of cylinders (11) arranged in two banks (10), and with a plurality of fuel injectors (16) each injecting fuel into a corresponding cylinder (11); the control method comprises the steps of:

detecting a slip of at least one drive wheel (3); and controlling the internal combustion engine (4), only during a slip of at least one drive wheel (3), with a signalling law, which causes the internal combustion engine (4) to work in an abnormal manner so as to generate an abnormal vibration and/or an abnormal noise, which can be perceived by the driver;

wherein the signalling law entails cyclically actuating an impulsive deviating event (R), which determines an impulsive gap in the torque generated by the internal combustion engine (4) and consists of at least an incomplete or failed injection of fuel into a single cylinder (11), which determines an incomplete or failed combustion in the cylinder (11);

wherein the internal combustion engine (4) comprises two twin control units (18), each of which is associated with a corresponding bank (10), controls all and the sole injectors (16) of its own bank (10) and is connected to a field BUS (19), into which the values of the control parameters are cyclically uploaded;

wherein each control unit (18) implements a signalling system (21) of its own, which controls, only during a slip of at least one drive wheel (3), the sole cylinders (11) of its own bank (10) with the signalling law; and wherein the signalling system (21) of each control unit (18) autonomously decides, namely without consulting with the signalling system (21) of the other control unit (18) in any way, a beginning and an end of the actuation of the unbalanced signalling law only based on the values of the parameters read in the field BUS (19).

2. The control method according to claim 1, wherein the signalling system (21) of each control unit (18) autonomously decides when to activate the unbalanced signalling law and when to deactivate the unbalanced signalling law completely ignoring what the signalling system (21) of the other control unit (18) is doing.

3. The control method according to claim 1, wherein the signalling system (21) of each control unit (18) is independent of and autonomous from the signalling system (21) of the other control unit (18) and operates independently of and separately from the signalling system (21) of the other control unit (18).

4. The control method according to claim 1, wherein:

the two signalling systems (21) implemented in the two control units (18) are perfectly identical, namely are completely twin systems; and the hardware of the two control units (18) is identical.

5. The control method according to claim 1, wherein the two signalling systems (21) implemented in the two control units (18) do not exchange synchronization signals with one another.

6. The control method according to claim 1, wherein:

a master control unit (18) processes at least one control parameter, which it publishes in the field BUS (19) and is read by a slave control unit (18);

the control parameter is used by both control units (18) in order to decide the beginning or the end of the actuation of the signalling law; and the master control unit (18) applies, to the control parameter, a time delay equal to the communication time delay in the field BUS (19) when it uses the control parameter to decide the beginning or the end of the actuation of the signalling law.

7. The control method according to claim 1, wherein a desired time frequency of the impulsive deviating event (E) is kept constant even as a rotational speed ($\omega$) of the internal combustion engine (4) changes.

8. The control method according to claim 7, wherein each signalling system (21) determines, depending on the desired time frequency of the impulsive deviating event (E) and depending on the rotational speed ($\omega$) of the internal combustion engine (4), the number of ignitions that have to take place between an impulsive deviating event (E) and the following impulsive deviating event (E).

9. The control method according to claim 7, wherein the two signalling systems (21) act with the same timing.

10. The control method according to claim 9, wherein each signalling system (21) actuates, without delay, a first impulsive deviating event (E) and repeats the impulsive deviating event (E) with a time frequency that is identical to the desired time frequency of the impulsive deviating event (E).

11. The control method according to claim 7, wherein the two signalling systems (21) act with a different timing.

12. The control method according to claim 11, wherein:

a first signalling system (21) actuates, without delay, a first impulsive deviating event (E) and repeats the impulsive deviating event (E) with a time frequency that is half the desired time frequency of the impulsive deviating event (E); and a second signalling system (21) actuates a first impulsive deviating event (E) with a delay corresponding to the desired time frequency of the impulsive deviating event (E) and repeats the impulsive deviating event (E) with a time frequency that is half the desired time frequency of the impulsive deviating event (E).

13. The control method according to claim 1 and comprising the further steps of:

making sure that the use of the signalling law does not determine an excess increase in an inner temperature (T) of a catalytic converter (15) present along an exhaust duct (14) of the internal combustion engine (4); and forbidding or interrupting the use of the signalling law if the use of the signalling law does not determine an excess increase in the inner temperature (T) of the catalytic converter (15).

14. The control method according to claim 1 and comprising the further steps of:

estimating an inner temperature (T) of a catalytic converter (15) present along an exhaust duct (14) of the internal combustion engine (4); and forbidding or interrupting the use of the signalling law if the inner temperature (T) of the catalytic converter (15) exceeds a safety threshold.

15. The control method according to claim 1 and comprising the further step of waiting for a resting amount of time, starting from the end of a previous use of the signalling law, before enabling a new and following use of the signalling law.

\* \* \* \* \*